United States Patent
Regnier et al.

[11] 3,821,225
[45] June 28, 1974

[54] PYRIDYL PIPERAZINES

[75] Inventors: Gilbert Regnier, Chatenay-Malabry; Roger Canevari, Villebon S/Yvette; Jacques Duhault, Chatou, all of France

[73] Assignee: Science Union Et Cie, Suresnes, France

[22] Filed: May 5, 1972

[21] Appl. No.: 250,567

[30] Foreign Application Priority Data
May 14, 1971 Great Britain.................... 14877/71

[52] U.S. Cl...... 260/268 H, 260/250 A, 260/250 R, 260/256.4, 260/268 H, 260/295.5 A, 424/250
[51] Int. Cl........................................... C07d 51/70
[58] Field of Search.................. 260/268 PH, 268 H

[56] References Cited
UNITED STATES PATENTS
3,705,899  12/1972  Regnier et al. ............... 260/256.4 N OTHER PUBLICATIONS
854 O.G., Number 2, page 287, 1968.
857 O.G., Number 1, page 1, 1968.

*Primary Examiner*—Donald G. Daus
*Assistant Examiner*—Ralph D. McCloud
*Attorney, Agent, or Firm*—Gordon W. Heuschen; John T. Reynolds

[57] ABSTRACT

Pyridyl piperazines of the formula:

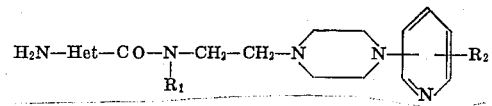

wherein Het is pyridyl, pyrimidinyl, pyridazinyl or pyrazinyl in which $NH_2$ is in a para position to CO, $R_1$ is hydrogen or lower-alkyl and $R_2$ is hydrogen, lower alkyl or lower alkoxy.

These compounds possess broncholytic, antianaphylactic and central nervous system depressant properties.

4 Claims, No Drawings

PYRIDYL PIPERAZINES

The present invention provides pyridyl piperazines of the general formula I:

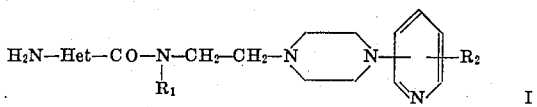

and acid addition salts thereof wherein:

Het is selected from the group consisting of pyridyl, pyrimidinyl, pyridazinyl and pyrazinyl radicals, and in which the amino radical is in a para position to the carbonyl group;

$R_1$ is selected from the group consisting of a hydrogen atom and alkyl radicals having from 1 to 4 carbon atoms inclusive, and $R_2$ is selected from the group consisting of a hydrogen atom and alkyl and alkoxy radicals each having from 1 to 4 carbon atoms inclusive.

The compounds of the general formula I are new and may be prepared by condensing a compound of an acetylamino heterocyclic carboxylic acid, for example a mixed anhydride of the general formula II:

$$CH_3-CO-NH-Het-COO-COO-C_2H_5 \quad II$$

with a disubstituted piperazine of the general formula III:

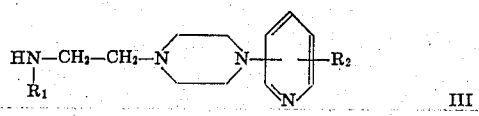

and then hydrolysing the so-obtained compound of the general formula IV

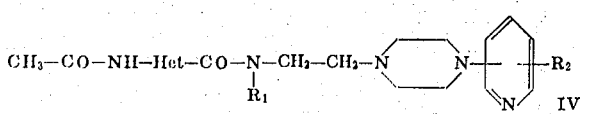

Het, $R_1$ and $R_2$ have in these formulae the meanings given above.

One of the most satisfactory ways of carrying out this process comprises preparing in situ a mixed anhydride of the general formula II by reacting ethyl chloroformate with a suitable acetylamino heterocyclic carboxylic acid, in a polar solvent, for example dimethylformamide, at a low temperature, preferably ≤ −5° C, in the presence of an acceptor for the hydrochloric acid formed during the reaction.

The acceptor is preferably a tertiary amine, for example triethylamine. The mixed anhydride of the formula II, formed in situ is then condensed with an excess of the piperazine of the formula III. The amide of the formula IV formed during the reaction crystallises from the solvent and is isolated by filtration or by extraction with a mineral acid and is then deacetylated by heating at a temperature ≤ 40° C for a short time in the presence of an alcoholic solution of sodium or potassium hydroxide.

The compounds of the formula I are weak bases which yield addition salts with strong inorganic or organic acids. As acids which may be used to form these salts there may be especially mentioned, for example, in the mineral series, hydrobromic acid, sulphuric acid and phosphoric acid and in the organic series, acetic acid, propionic acid, maleic acid, fumaric acid, tartaric acid, citric acid, oxalic acid, benzoic acid, methanesulphonic acid and isethionic acid.

The following Examples illustrate the invention, the melting points being determined in a capillary tube.

EXAMPLE 1

1-(6-amino-nicotinamidoethyl)-4-(2-pyridyl) piperazine

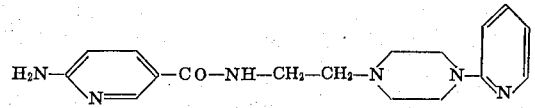

16.1 g (0.16 mole) of triethylamine were added to a solution of 14.4 g (0.08 mole) of 6-acetamido-nicotinic acid in 300 ml of anhydrous dimethylformamide. The mixture was cooled to −10° C, and a solution of 17.3 g (0.16 mole) of ethyl chloroformate in 20 ml of dimethylformamide was added over a period of 15 minutes. The mixture was allowed to stand at −10° C for two hours, and then 34.6 g (0.16 mole) of 1-aminoethyl-4-(2-pyridyl)-piperazine were added over a period of 20 minutes, the mixture being maintained at a temperature of ≤ −5° C. The reaction mixture was then allowed to stand at room temperature for 18 hours. The crystals of triethylamine hydrochloride which had formed were suction-filtered off and the filtrate evaporated under vacuum. The oily residue was dissolved in 75 ml of anhydrous ethanol, the solution filtered, and allowed to crystallise in a refrigerator. The beige crystals obtained were suctioned off. There were obtained 22.8 g of 1-(6-acetamido-nicotinamidoethyl)-4-(2-pyridyl) piperazine melting at 190°–192° C. 22.5 g (0.061 mole) of these crystals were dissolved in 1 300 ml of ethanol, and the solution was heated at 40° C for 15 minutes in presence of a solution of 6.9 g of potassium hydroxide in 9 ml of water. The solution was then evaporated down to a volume of 50 ml.

The remaining solution was allowed to crystallise in a refrigerator over night. There were obtained 15.5 g of crystals, which recrystallised in 300 ml of isopropanol, gave 12 g of pure 1-(6-amino-nicotinamidoethyl)-4-(2-pyridyl) piperazine, melting at 169°–171° C.

EXAMPLES 2 to 11

The following compounds were prepared according to the process described in Example 1.

2. 1-(6-amino nicotinamidoethyl)-4-(6-methyl-2-pyridyl) piperazine, M.P. 179°–181° C (anhydrous isopropanol), starting from 1-(6-acetamido-nicotinamidoethyl)-4-(6-methyl-2-pyridyl) piperazine, M.P. 208°–211° C, itself prepared from 6-acetamido-nicotinic acid and 1-aminoethyl-4-(6-methyl-2-pyridyl) piperazine.

3. 1-(6-amino-nicotinamidoethyl)-4-(4-methyl-2-pyridyl) piperazine, M.P. 176°–177° C (anhydrous methanol), starting from 1-(6-acetamido-nicotinamidoethyl)-4-(4-methyl-2-pyridyl) piperazine, M.P. 175°–178° C, itself prepared from 6-acetamido-nicotinic acid and 1-aminoethyl-4-(4-methyl-2-pyridyl) piperazine.

4. 1-(6-amino-nicotinamidoethyl)-4-(6-methoxy-2-pyridyl) piperazine, M.P. 144°–145° C (ethyl acetate), starting from 1-(6-acetamido-nicotinamido ethyl)-4-(6-methoxy-2-pyridyl) piperazine, M.P. 175°–178° C, itself prepared from 6-acetamido-nicotinic acid and 1-aminoethyl-4-(6-methoxy-2-pyridyl) piperazine.

5. 1-(N-methyl-6-amino-nicotinamido ethyl)-4-(2-pyridyl) piperazine, starting from 1-(N-methyl-6-acetamido-nicotinamidoethyl)-4-(2-pyridyl) piperazine, itself prepared from 6-acetamido-nicotinic acid and 1-methylaminoethyl-4-(2-pyridyl) piperazine.

6. 1-(5-amino-2-pyridinecarboxamidoethyl)-4-(2-pyridyl) piperazine, starting from 1-(5-acetamido-2-pyridinecarboxamidoethyl)-4-(2-pyridyl) piperazine, itself prepared from 5-acetamido-2-pyridinecarboxylic acid and 1-aminoethyl-4-(2-pyridyl) piperazine.

7. 1-(6-amino-3-pyridazinecarboxamidoethyl)-4-(2-pyridyl) piperazine, M.P. 158°–162° C, (ethanol), starting from 1-(6-acetamido-3-pyridazinecarboxamidoethyl)-4-(2-pyridyl) piperazine, itself prepared from 6-acetamido-3-pyridazinecarboxylic acid and 1-aminoethyl-4-(2-pyridyl) piperazine.

8. 1-(2-amino-5-pyrimidinecarboxamidoethyl)-4-(2-pyridyl) piperazine, M.P. 223°–228° C (anhydrous ethanol), starting from 1-(2-acetamido-5-pyrimidinecarboxamidoethyl)-4-(2-pyridyl) piperazine, itself prepared from 2-acetamido-5-pyrimidinecarboxylic acid and 1-aminoethyl-4-(2-pyridyl) piperazine.

9. 1-(6-amino-3-pyrazinecarboxamidoethyl)-4-(2-pyridyl) piperazine, M.P. 234°–238° C (methanol), starting from 1-(6-acetamido-3-pyrazinecarboxamidoethyl)-4-(2-pyridyl) piperazine, itself prepared from 6-acetamido-3-pyrazinecarboxylic acid and 1-aminoethyl-4-(2-pyridyl) piperazine.

10. 1-(6-amino-nicotinamidoethyl)-4-(4-pyridyl) piperazine, starting from 1-(6-acetamido-nicotinamidoethyl)-4-(4-pyridyl) piperazine, itself prepared from 6-acetamido-nicotinic acid and 1-aminoethyl-4-(4-pyridyl) piperazine.

11. 1-(2-amino-5-pyrimidinecarboxamidoethyl)-4-(4-pyridyl) piperazine, starting from 1-(2-acetamido-5-pyrimidinecarboxamidoethyl)-4-(4-pyridyl) piperazine, itself prepared from 2-acetamido-5-pyrimidinecarboxylic acid and 1-aminoethyl-4-(4-pyridyl) piperazine.

The compounds of the general formula I and physiologically tolerable salts thereof possess valuable pharmacological and therapeutic properties, especially broncholytic, antianaphylactic and central nervous system depressant properties and they are, therefore, useful as medicines.

Their toxicity is weak and the $LD_{50}$ in mice is situated between 200 and 400 mg/kg by intraperitoneal administration.

The bronchodilatory activity was studied in the guinea-pig by the method of H. Konzett and R. Rossler (Arch. Exp. Path. U. Pharm. 195, 71 (1940)). The new compounds injected intravenously at doses of 0,10 to 2,50 mg/kg, inhibit totally (100 %) the bronchospasm provoked by intravenous injection of histamine, serotonine and acetylcholine.

By the method of A.K. Armitage (Brit J. Pharmacol. 17, 196 (1961)), it was demonstrated, that the compounds of the invention administered intraperitoneally at doses of 0,25 to 5 mg/kg protect 50 % of the guinea-pigs submitted to a 4 % histamine aerosol.

The new compounds administered by intraperitoneal route at doses of 5 to 20 mg/kg, protect 50 % of mice against the anaphylactic shock provoked by the intravenous reinjection of 0,2 ml of a solution of 1,5 mg/ml of bovine albumin in pretreated animals by bovine albumin injection a fortnight before.

The above described pharmacological properties, as well as the low toxicity allow the use of the new compounds in therapy, especially in the treatment of bronchial asthma and anaphylactic shock.

The present invention also provides pharmaceutical compositions containing a compound of general formula I or a physiologically tolerable salt thereof in admixture or conjunction with a suitable pharmaceutical carrier such, for example, as distilled water, glucose, lactose, starch, talc, ethyl cellulose, magnesium stearate and cocoa butter. The pharmaceutical compositions may be in the form of, for example, tablets, dragees, capsules, suppositories or solutions, for oral, rectal or parenteral administration. The doses may vary from 5 to 100 mg, 1 to 5 times a day.

We claim:

1. A compound selected from the group consisting of:

A. pyridyl piperazines of the formula:

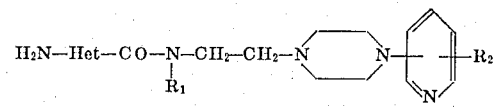

wherein:
Het is 2 or 3-pyridyl in which the amino is in a para position to the carbonyl group;
$R_1$ is selected from the group consisting of hydrogen, and alkyl having from 1 to 5 carbon atom inclusive; and
$R_2$ is selected from the group consisting of hydrogen, alkyl of 1 to 5 carbon atoms and alkoxy each having from 1 to 5 carbon atoms inclusive wherein the floating pyridyl is attached to the piperazine nitrogen at the 2-, 3-, or 4-position of said pyridyl;

and,

B. physiologically tolerable acid addition salts thereof.

2. The compound of claim 1 which is 1-(6-amino-nicotinamidoethyl)-4-(2-pyridyl) piperazine.

3. The compound of claim 1 which is 1-(6-amino-nicotinamidoethyl)-4-(4-methyl-2-pyridyl) piperazine.

4. The compound of claim 1 which is 1-(6-amino-nicotinamidoethyl)-4-(6-methoxy-2-pyridyl) piperazine.

* * * * *